United States Patent
Mehio et al.

(10) Patent No.: US 7,653,374 B2
(45) Date of Patent: Jan. 26, 2010

(54) REAL-TIME E911 LOCATION INFORMATION IN A CONSUMER VOIP SOLUTION

(75) Inventors: Mohamad Mehio, Naperville, IL (US); Gerald W. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 576 days.

(21) Appl. No.: 11/336,149

(22) Filed: Jan. 20, 2006

(65) Prior Publication Data

US 2007/0173223 A1    Jul. 26, 2007

(51) Int. Cl.
*H04M 11/04* (2006.01)

(52) U.S. Cl. .................. 455/404.1; 455/404.2; 370/352

(58) Field of Classification Search ................. 370/352, 370/356, 372.1, 389, 401; 455/404.1–2, 455/456.1; 379/45, 49; 340/539.1, 539.13
See application file for complete search history.

(56) References Cited

U.S. PATENT DOCUMENTS

| | | | |
|---|---|---|---|
| 7,054,611 B2 * | 5/2006 | Eisner et al. | 455/404.1 |
| 2005/0153681 A1 * | 7/2005 | Hanson | 455/404.2 |
| 2006/0007915 A1 * | 1/2006 | Frame | 370/352 |
| 2006/0121916 A1 * | 6/2006 | Aborn et al. | 455/456.5 |
| 2007/0008961 A1 * | 1/2007 | Martino | 370/389 |
| 2007/0025544 A1 * | 2/2007 | Shaffer et al. | 379/266.01 |
| 2007/0115930 A1 * | 5/2007 | Reynolds et al. | 370/352 |
| 2007/0142028 A1 * | 6/2007 | Ayoub et al. | 455/404.1 |
| 2007/0160036 A1 * | 7/2007 | Smith | 370/356 |

* cited by examiner

*Primary Examiner*—CongVan Tran
(74) *Attorney, Agent, or Firm*—Carmen Patti Law Group, LLC

(57) ABSTRACT

An apparatus in one example has: a VOIP telecommunications network; a VOIP telecommunication device operatively coupled to the VOIP telecommunications network; and the VOIP telecommunication device having a detector that recognizes a predetermined pattern in a data stream from the VoIP telecommunication device, and a call processor that initiates a predetermined call in a cellular telecommunication network in response to recognition of the predetermined pattern.

18 Claims, 3 Drawing Sheets

REAL-TIME E911 LOCATION INFORMATION IN A CONSUMER VOIP SOLUTION

TECHNICAL FIELD

The invention relates generally to telecommunication networks and Voice over Internet Protocol (VoIP), and more particularly to providing information about the location of a VoIP telephone user associated with a 911 request for emergency services.

BACKGROUND

One of the larger obstacles in implementing VOIP is how emergency/911 calls are handled and how to transmit current 911 calling party location information in the case of an emergency. Most commercially available systems now require that configuration changes be made in back end databases, manually or by some user submission, each time the phone is moved, or that there is information in the phone itself that must be configured if it is moved. Some systems simply do not allow a direct connection for 911 calls.

For some current VOIP users this is not a major problem as they still have analog land lines and are only using VOIP as a supplement to traditional service offerings. In these situations once the physical telephone set is installed it does not usually move. However, as VOIP providers continue to attempt to expand market share this limitation will become more of an issue. Also, it is clear that national, state and local regulators will be demanding a more robust and failsafe solution regarding making emergency calls from VOIP type telecommunication devices.

Therefore, there is a need in the art for a system that allows users of VOIP phones to be able to place 911 calls and have the calls connect in order to provide correct information to a 911 operator.

SUMMARY

One implementation encompasses an apparatus. This apparatus may comprise: a VOIP telecommunications network; a VOIP telecommunication device operatively coupled to the VOIP telecommunications network; and the VOIP telecommunication device having a detector that recognizes a predetermined pattern in a data stream from the VoIP telecommunication device, and a call processor that initiates a predetermined call in a cellular telecommunication network in response to recognition of the predetermined pattern.

One implementation encompasses a method. This embodiment of the method may comprise: recognizing a predetermined pattern in a data stream from a VoIP telecommunication device; and initiating a predetermined call in a cellular telecommunication network in response to recognition of the predetermined pattern.

DESCRIPTION OF THE DRAWINGS

Features of exemplary implementations will become apparent from the description, the claims, and the accompanying drawings in which:

DETAILED DESCRIPTION

Figure 1:
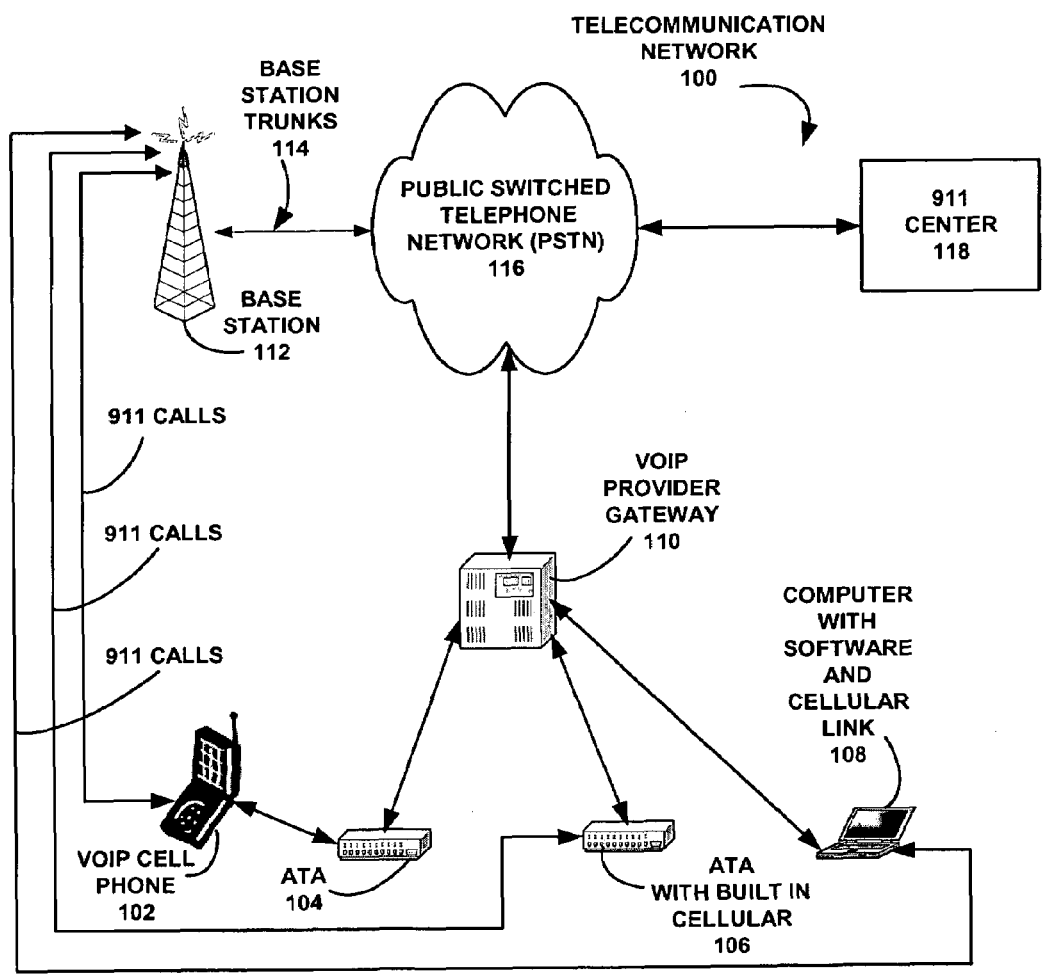
FIG. 1 is an embodiment in a telecommunication network according to the present method and apparatus.

A major development has been the introduction of mass-market VoIP services over broadband Internet access services, in which subscribers make and receive calls as they would over the PSTN. This requires an analog telephone adapter (ATA) to connect a telephone to the broadband Internet connection. Full phone service VoIP phone companies provide inbound and outbound calling. Many offer unlimited calling to the U.S., and sometimes to Canada or to selected countries in Europe or Asia, for a flat monthly fee. One advantage of this is the ability to make and receive calls as one would at home, anywhere in the world, at no extra cost. As calls go via EP, this does not incur charges as call diversion does via the PSTN, and the called party does not have to pay for the call.

In VoIP systems most standards-based solutions use either the H.323, which defines protocols to provide audio-visual communication sessions on any packet network, or Session Initiation Protocol (SIP) protocols, which are protocols for initiating, modifying, and terminating an interactive user session that involves multimedia elements.

VOIP allows a user to make telephone calls using a computer network, over a data network like the Internet. VoIP converts the voice signal from the user's telephone into a digital signal that travels over the Internet then converts it back at the other end so that the user can speak to anyone with a regular phone number. When placing a VOIP call using a phone with an analog telephone adapter (ATA), the user will hear a dial tone and will be able to dial just as the user always has. VoIP may also allow a user to make a call directly from a computer using a conventional telephone or a microphone.

The nature of IP makes it difficult to geographically locate mobile or moved network users. Emergency calls, therefore, can not easily be routed to a nearby emergency call center, and are actually impossible on some VoIP systems. Moreover, in the event that the caller is unable to give an address, emergency services may be unable to locate them. Following the lead of mobile phone carriers, several VoIP carriers are already implementing a technical work-around. The United States government has been setting deadlines, requiring VoIP carriers to implement E911.

E911 (Enhanced 911) is a location technology advanced by the FCC that will enable mobile, or cellular, phones to process 911 emergency calls and enable emergency services to locate the geographic position of the caller. When a person makes a 911 call using a traditional phone with ground wires, the call is routed to the nearest public safety answering point (PSAP) that then distributes the emergency call to the proper services. The PSAP receives the caller's phone number and the exact location of the phone from which the call was made. Prior to 1996, 911 callers using a mobile phone would have to access their service providers in order to get verification of subscription service before the call was routed to a PSAP. In 1996 the FCC ruled that a 911 call must go directly to the PSAP without receiving verification of service from a specific cellular service provider. The call must be handled by any available service carrier even if it is not the cellular phone customer's specific carrier. Under the FCC's rules, all mobile phones manufactured for sale in the United States after Feb. 13, 2000, that are capable of operating in an analog mode must include this special method for processing 911 calls.

The FCC has rolled out E911 in two phases. In 1998, Phase I required that mobile phone carriers identify the originating call's phone number and the location of the signal tower, or cell, accurate to within a mile. In 2001, Phase II required that each mobile phone company doing business in the United States must offer either handset- or network-based location detection capability so that the caller's location is determined by the geographic location of the cellular phone within 100 meter accuracy and not the location of the tower that is transmitting its signal. The FCC refers to this as Automatic Location Identification (ALI).

Thus, current cellular networks are mandated to allow for E911 services to accurately pinpoint a person's location within a few feet when a call is made by using triangulation or GPS measurement. There are also current regulations that mandate that cellular networks must allow emergency call placement from any device whether or not it has current service.

FIG. 1 depicts a telecommunication network 100 in which various VOIP devices, such as VOIP cell phone 102, ATA 104, ATA with built in cellular 106, and laptop 108 with software and hardware for establishing a cellular link. Various other VOIP devices are possible, such as a VOIP equipped PDA (personal data assistant). For handling VOIP calls each of the devices may place the calls through the Internet. However, for placing 911 calls, for example, the cell phone 102, the ATA 106 and the laptop 108 may be operatively coupled to a base station 112 that may be operatively coupled to a PSTN 116 by base station trunks 114. The PSTN 116 may be operatively coupled to a 911 center 118.

In one embodiment of the present method a small cellular chip may be used in a pure VOIP phone or telephony device/ATA (including laptop soft phone) to determine a current location of the phone regardless of its movement or installation status (not fully registered with 911 database). In order to retrofit devices currently in the field a stand-alone small box/device, such as ATA 104, may be added in-line with the VOIP device, such as VOIP cell phone 102, to perform the same function.

When a user dials 911 from any phone connected to the VOIP device, the device recognizes that the caller dialed 911 and from the rules programmed in the device a call may be placed over the cellular chip in the end device. The call may then be handled like any call connecting to the cellular network that is an emergency call. If the device has been retrofitted with an external box, such as ATA 104, then that box may watch for a dialing pattern on its out going stream and may intercept any emergency call traffic and send it over the cellular network.

In order to lessen the impact of these devices riding on the cellular carriers networks, the cellular chip itself may be in a constant powered state, but not have the antenna portion powered to a level that would be able to generate enough signal to connect to the network. Upon receiving a 911 call the antenna portion is then powered up.

The same technology may be used to allow a cellular network connection for a backup of all traffic in the event of a failure on the VOIP leg of the network. It may use many of the principles of the dual mode WiFi/cellular handsets that are starting to appear in the market.

Figure 2:
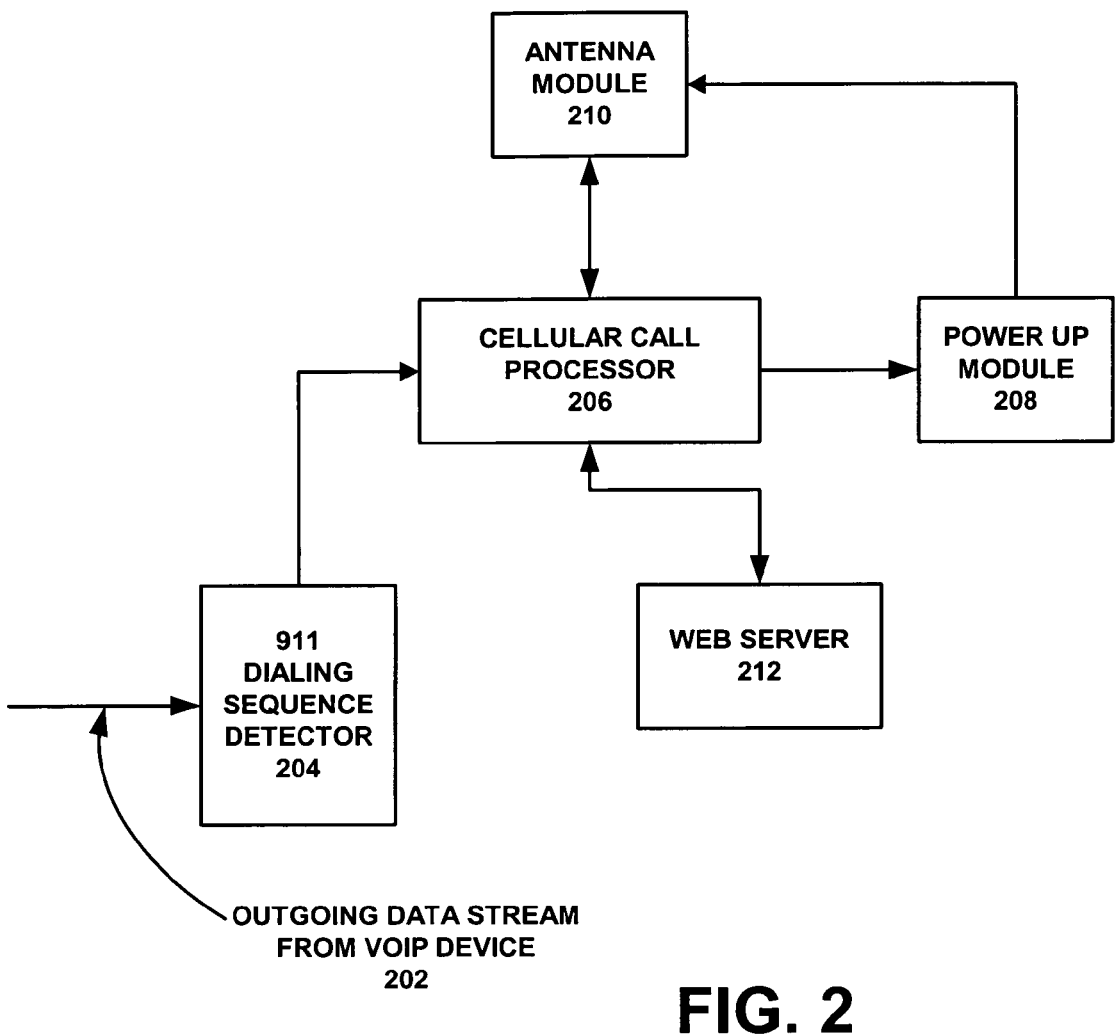
FIG. 2 is another embodiment in a telecommunication network according to the present method and apparatus.

FIG. 2 depicts one embodiment of an ATA. In this embodiment a 911 dialing sequence detector 204 receives an outgoing data stream 202 from a VOIP device. When the 911 dialing sequence is detected, a cellular call processor 206, places a 911 call on a cellular network via an antenna module 210. Other dialing sequences may be detected for automatically placing predetermined calls for other purposes. For example, a business may have certain calls generated by mobile employees place directly to a predetermined department of the business.

In order to save power, the antenna module 210 may by powered down, or turned off, when not in use. Upon detecting a 911 call by the detector 204, the processor 206 signals a power up module 208 to power up the antenna module 210. A web server 212 may also be operatively coupled to the processor 206 for configuration purposes.

Figure 3:
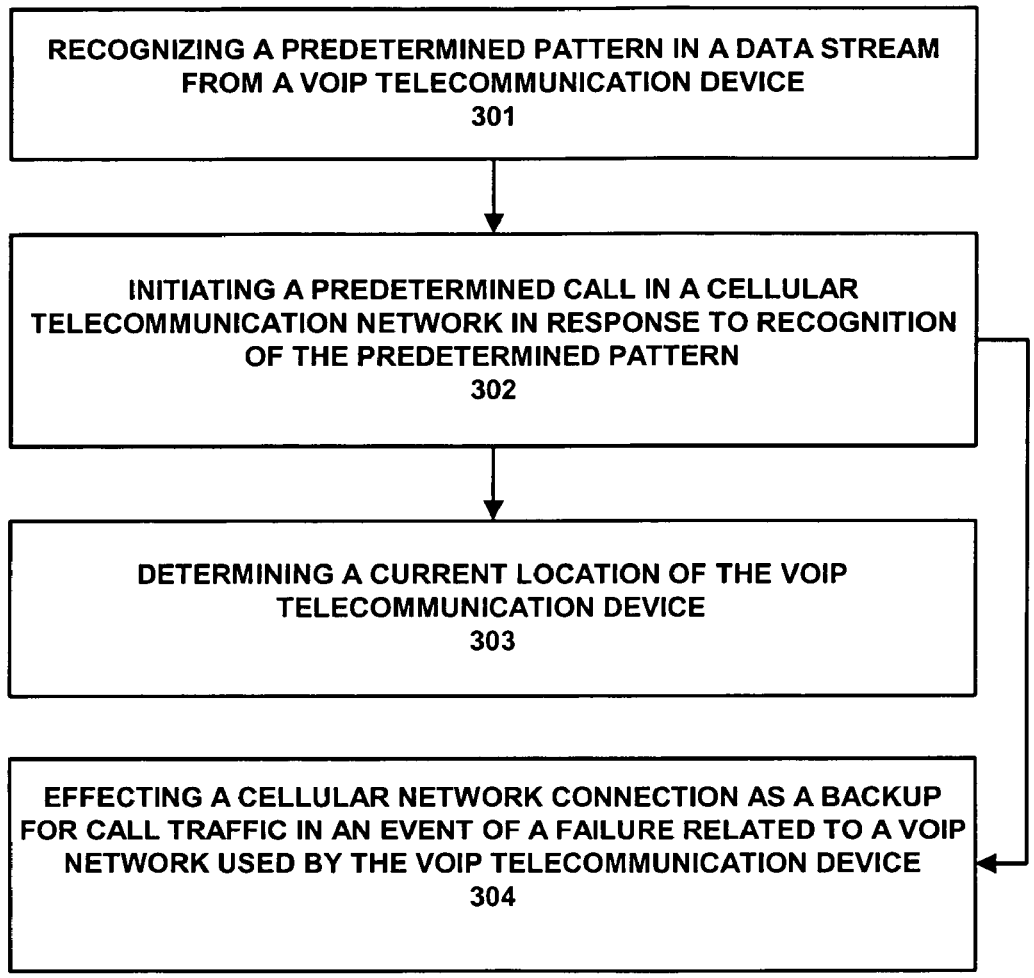
FIG. 3 is flowchart depicting an embodiment according to the present method.

FIG. 3 is flowchart depicting an embodiment according to the present method. This embodiment of the present method may have the steps of: recognizing a predetermined pattern in a data stream from a VOIP telecommunication device (301); and initiating a predetermined call in a cellular telecommunication network in response to recognition of the predetermined pattern (302). The VOIP telecommunication device may be one of a combination cellular and VOIP phone, an ATA (analog telephone adapter) operatively coupled to a VOIP phone, an ATA (analog telephone adapter) operatively coupled to a computer, laptop soft phone and a cellular communication equipped computer. The predetermined pattern may be an emergency services number, such as, 911.

The present method may further have the step of determining a current location of the VOIP telecommunication device (303). The VOIP telecommunication device may be moving and/or the VOIP telecommunication device may not be registered with any 911 database. The method may also further include effecting a cellular network connection as a backup for call traffic in an event of a failure related to a VOIP network used by the VOIP telecommunication device (304).

The present apparatus in one example may comprise a plurality of components such as one or more of electronic components, hardware components, and computer software components. A number of such components may be combined or divided in the apparatus.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising:
   recognizing a predetermined pattern in a data stream from a VOIP telecommunication device; and
   telephony processing in the VOIP telecommunication device for initiating a predetermined call in a cellular telecommunication network in response to recognition of the predetermined pattern;
   powering down an antenna, on the VOIP telecommunication device, when not in use; and
   effecting a cellular network connection as a backup for call traffic in an event of a failure related to a VOIP network used by the VOIP telecommunication device.

2. The method according to claim 1, wherein the VOIP telecommunication device is one of a combination cellular and VOIP phone, an ATA (analog telephone adapter) operatively coupled to an analog phone, an ATA (analog telephone adapter) operatively coupled to a FDA or WiFi Phone, laptop soft phone and a cellular communication equipped computer.

3. The method according to claim 1, wherein the predetermined pattern is an emergency services number.

4. The method according to claim 3, wherein the emergency services number is 911.

5. The method according to claim 1, wherein the method further comprises determining a current location of the VOIP telecommunication device.

6. The method according to claim 1, wherein the VOIP telecommunication device is moving.

7. The method according to claim 1, wherein the VOIP telecommunication device is not registered with any 911 database.

8. An apparatus, comprising:
a VOIP telecommunications network;
a VOIP telecommunication device operatively coupled to the VOIP telecommunications network;
the VOIP telecommunication device having a detector that recognizes a predetermined pattern in a data stream from the VOIP telecommunication device, and a call processor that telephony processes in the VOIP telecommunication device and that initiates a predetermined call in a cellular telecommunication network in response to recognition of the predetermined pattern;
an antenna on the VOIP telecommunication device, the antenna being powered down when not in use; and
effecting the cellular network connection as a backup for call traffic in an event of a failure related to the VOIP telecommunication network used by the VOIP telecommunication device.

9. The apparatus according to claim 8, wherein the VOIP telecommunication device is one of a combination cellular and VOIP phone, an ATA (analog telephone adapter) operatively coupled to an analog phone, an ATA (analog telephone adapter) operatively coupled to a PDA or WiFi Phone, laptop soft phone and a cellular communication equipped computer.

10. The apparatus according to claim 8, wherein the predetermined pattern is an emergency services number.

11. The apparatus according to claim 10, wherein the emergency services number is 911.

12. The apparatus according to claim 8, wherein the VOIP telecommunication device is moving.

13. The apparatus according to claim 8, wherein the VOIP telecommunication device is not registered with any 911 database.

14. The apparatus according to claim 8, wherein the apparatus the VOIP telecommunication device further comprises an antenna module operatively coupled to the processor, and a power up module operatively coupled to the antenna module and the processor, wherein the power up module powers up the antennas when the processor places a 911 call.

15. The apparatus according to claim 8, wherein the VOIP telecommunication device further comprises a web server operatively coupled to the processor for configuring the processor.

16. A method, comprising:
recognizing a predetermined pattern in a data stream from a moving VOIP telecommunication device;
telephony processing in the VOIP telecommunication device for initiating a 911 call in a cellular telecommunication network in response to recognition of the predetermined pattern;
locating a current location of the VOIP telecommunication device;
powering down an antenna, on the VOIP telecommunication device, when not in use; and
effecting a cellular network connection as a backup for call traffic in an event of a failure related to a VOIP network used by the VOIP telecommunication device.

17. The method according to claim 16, wherein the VOIP telecommunication device is one of a combination cellular and VOIP phone, an ATA (analog telephone adapter) operatively coupled to an analog phone, an ATA (analog telephone adapter) operatively coupled to a PDA or WiFi Phone, laptop soft phone and a cellular communication equipped computer.

18. The method according to claim 16, wherein the VOIP telecommunication device is not registered with any 911 database.

* * * * *

UNITED STATES PATENT AND TRADEMARK OFFICE
CERTIFICATE OF CORRECTION

PATENT NO.       : 7,653,374 B2                                       Page 1 of 1
APPLICATION NO. : 11/336149
DATED            : January 26, 2010
INVENTOR(S)      : Mehio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,374 B2 | |
| APPLICATION NO. | : 11/336149 | |
| DATED | : January 26, 2010 | |
| INVENTOR(S) | : Mohamad Mehio et al. | |

It is certified that error appears in the above-identified patent and that said Letters Patent is hereby corrected as shown below:

In the Claim 2., line 62:

The word "PDA" is spelled incorrectly.

Please delete "FDA" and insert -- PDA --.

Signed and Sealed this
Twentieth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,374 B2 | Page 1 of 1 |
| APPLICATION NO. | : 11/336149 | |
| DATED | : January 26, 2010 | |
| INVENTOR(S) | : Mohamad Mehio et al. | |

It is certified that error appears in the above-identified patent and that said Letters Patent is hereby corrected as shown below:

Column 4, line 62 (Claim 2, line 5)

The word "PDA" is spelled incorrectly.

Please delete "FDA" and insert -- PDA --.

This certificate supersedes the Certificate of Correction issued September 20, 2011.

Signed and Sealed this
Eighteenth Day of October, 2011

David J. Kappos
*Director of the United States Patent and Trademark Office*